United States Patent [19]

Chang et al.

[11] Patent Number: 4,871,702
[45] Date of Patent: Oct. 3, 1989

[54] AMMONIUM ACTIVATION OF ZEOLITES IN THE PRESENCE OF GASEOUS AMMONIA

[75] Inventors: Clarence D. Chang; Cynthia T-W. Chu; Carol S. Lee, all of Princeton; Randall D. Partridge, Trenton, all of N.J.

[73] Assignee: Mobil Oil Corp., New York, N.Y.

[21] Appl. No.: 246,391

[22] Filed: Sep. 19, 1988

Related U.S. Application Data

[63] Continuation-in-part of Ser. No. 140,359, Jan. 4, 1988, Pat. No. 4,837,398, which is a continuation-in-part of Ser. No. 081,955, Aug. 5, 1987, abandoned.

[51] Int. Cl.$^4$ .......................... B01J 29/06; B01J 29/38
[52] U.S. Cl. .......................................... 502/86; 502/26
[58] Field of Search .............................. 502/86, 71, 26

[56] References Cited

U.S. PATENT DOCUMENTS 3,404,086 10/1968 Plank et al. ........................... 502/86
4,596,704 6/1986 Miale et al. ........................... 502/86

Primary Examiner—Carl F. Dees
Attorney, Agent, or Firm—Alexander J. McKillop; Charles J. Speciale; Dennis P. Santini

[57] ABSTRACT

Alumina-composited zeolite catalysts are activated by contact with an aqueous ammonium solution under ammonia gas pressure such that a pH of at least about 10 is maintained in the solution. The treated zeolite may thereafter be calcined without prior ammonium-exchange to provide the zeolite in the hydrogen form.

24 Claims, No Drawings

AMMONIUM ACTIVATION OF ZEOLITES IN THE PRESENCE OF GASEOUS AMMONIA

CROSS REFERENCE TO RELATED APPLICATION

This application is a continuation-in-part of copending U.S. Application Ser. No. 140,359, filed Jan. 4, 1988, now U.S. Pat. No. 4,837,398, which is a continuation in part of U.S. Application Ser. No. 081,955, filed Aug. 5, 1987, now abandoned, the entire disclosures of which are expressly incorporated herein by reference.

BACKGROUND

This invention relates to the activation of alumina-bound porous crystalline silicate catalysts, e.g., zeolite catalysts, by contact with an aqueous ammonium solution under ammonia gas pressure such that a pH of at least about 10 is maintained in the solution. Zeolites deactivated by steam or hydrocarbon conversion processes are particularly suited to activation by the method of the present invention.

Methods for enhancing the catalytic activity of zeolite materials are well known, including treatments involving ammonium ion or ammonia. U.S. Pat. No. 4,326,994 relates to a process for enhancing acidic activity of a highly siliceous zeolite by contact with steam and ammonia. Ammoniacal aluminum fluoride is taught as a reagent for zeolite activation in U.S. Pat. No. 4,427,788 while U.S. Pat. No. 3,684,738 discloses the treatment of deactivated oxygen regenerated zeolites with a source of hydrogen ions or hydrogen ion precursors such as an ammonium chloride solution. U.S. Pat. No. 4,427,788 teaches the use of aluminum fluoride in solution with at least one member selected from the group consisting of ammonium hydroxide and ammonia. U.S. Pat. No. 4,500,419 teaches zeolite activation by treatment with hydrogen fluoride, followed by ammonolysis. All of the above references are incorporated herein by reference.

SUMMARY

It has now been found that the catalytic activity of an alumina-bound zeolite having a determinable initial activity can be increased by contacting the zeolite with an aqueous ammonium solution under ammonia gas pressure such that a pH of at least about 10, preferably at least about 11, is maintained in the solution for about 2 to 72 hours, preferably for about 10 to 48 hours. The resulting zeolite can be calcined thereafter in order to convert the zeolite to the hydrogen form without ammonium-exchange treatment.

The present invention can also be described as a method for modifying a composition to increase its acid catalytic activity. The composition comprises a solid source of aluminum such as an aluminum oxide binder and a zeolite having a constraint index of about 1 to 12. The method of the invention comprises contacting said composition with an aqueous ammonium solution under ammonia gas pressure such that a pH of at least about 10, preferably at least about 11 is maintained in the solution. A combination of conditions is maintained during this treatment so as to effect an increase in catalytic activity. Such conditions can include a temperature of about 60° to 200° C., preferably 90° to 150° C., preferably for about 10 to 48 hours. The resulting composition may then be calcined in an inert or oxygen-containing atmosphere in order to place it in a catalytically active form without the need for exposing the resulting composition to ammonium exchange conditions. Calcination can take place at about 200° to 600° C., preferably about 500° to 550° C., for about 1 minute to 48 hours, preferably about 0.5 to 6 hours. In one embodiment of the present invention, ammonium is provided to the aqueous ammonium solution by an ammonium source selected from the group consisting of $(NH_4)_2CO_3$, $NH_4OH$ and $(NH_4)_2HPO_4$.

An example of a catalyst that can be reactivated by methods of the present invention is one that has become deactivated by a process for converting alcohols and/or ethers to hydrocarbons. This process is described in C. D. Chang, Catal. Rev.-Sci. Eng., 26(34), 323–345 (1984). Another example of a catalyst that can be activated by methods of the present invention is one that has become deactivated by a process for dewaxing hydrocarbons. Such a process is described in N. Y. Chen, R. L. Gorring, H. R. Ireland, and T. R. Stein, Oil & Gas Journal, 75(23), 165–170 (1977). The catalyst that is activated by methods of the present invention may be used, e.g., in a process for converting alcohols and/or ethers to hydrocarbons including aromatics, or in a process for dewaxing hydrocarbons.

The activated catalysts in accordance with the method of the present invention may be prepared by heating the deactivated catalyst with the aqueous ammonium solution under autogenous pressure, under ammonia gas pressure, or a combination thereof. Where the catalyst is prepared by heating under autogenous pressure, the aqueous ammonium solution, before applying heat, may have an ammonium concentration of from about 1 to 15N, preferably from about 5 to 12N. Where the catalyst is prepared by heating under ammonium gas pressure, the aqueous ammonium solution, before applying heat or pressure, may have an ammonium concentration of from about 0.001 to 10N, e.g., from about 0.01 to 10N, e.g., from about 0.1 to 5N (equivalents of ammonium ion/liter). Ammonia gas pressure employed may range, e.g., from about 5 to 1000 psig, preferably from about 10 to 100 psig, more preferably from about 20 to 60 psig.

The contacting may also occur in the presence of a weak acid having a pKa of at least about 2 at 25° C. Examples of such weak acids include $H_2CO_3$, $H_3BO_3$, $H_3PO_4$, acetic and citric acid. Alternatively, said contacting can occur in the presence of an alkylammonium hydroxide, such as tetrapropylammonium hydroxide.

The catalyst, after activation by methods of the present invention, may advantageously be further modified by contact with steam at about 0.1 to 1 atm water and 500° to 1700° F. for about 1 hour to about 1 week at an overall pressure of 1 to 100 atm.

EMBODIMENTS

The catalyst composition treated by the method of the present invention may be one which has teen previously utilized in an organic feedstock to hydrocarbon conversion under conditions sufficient to deactivate said composition by removal of aluminum from said zeolite framework. In another aspect of the invention, the catalyst composition treated by the present method is one which has been previously contacted with steam under conditions sufficient to deactivate the composition by removal of aluminum from the zeolite framework. Such deactivation can occur under conditions of about 500° to 1700° F., for less than 1 hour to 1 week, at 50 ppm H₂O to 1 atm H₂O, and an overall pressure of less than 1 atm pressure to 3000 atm.

Zeolite materials, both natural and synthetic, have been demonstrated in the past to have catalytic properties for various types of hydrocarbon conversion. Certain zeolitic materials are ordered, porous, crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of the cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. The zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite beta (U.S. Pat. No. 3,308,069), zeolite ZK-5 (U.S. Pat. No. 3,247,195), zeolite ZK-4 (U.S. Pat. No. 3,314,752), zeolite ZSM-5 (U.S. Pat. No. 3,702,886), ZSM-5/ZSM-11 intermediate (U.S. Pat. No. 4,229,424), zeolite ZSM-23 (U.S. Pat. No. 4,076,842), zeolite ZSM-11 (U.S. Pat. No. 3,709,979), zeolite ZSM-12 (U.S. Pat. No. 3,832,449), zeolite ZSM-20 (U.S. Pat. No. 3,972,983), ZSM-35 (U.S. Pat. No. 4,016,245), ZSM-38 (U.S. Pat. No. 4,046,859), and zeolite ZSM-48 (U.S. Pat. No. 4,375,573), merely to name a few. All of the above patents are incorporated herein by reference.

The silicon/aluminum atomic ratio of a given zeolite is often variable. For example, zeolite X can be synthesized with silicon/aluminum atomic ratios of from 1 to 1.5; zeolite Y, from 1.5 to about 3. In some zeolites, the upper limit of the silicon/aluminum atomic ratio is unbounded. ZSM-5 is one such example wherein the silicon/aluminum atomic ratio is at least 12. U.S. Pat. No. 3,941,871 (Re. 29,948) discloses a porous crystalline silicate made from a reaction mixture containing no deliberately added aluminum in the recipe and exhibiting the X-ray diffraction pattern characteristic of ZSM-5 type zeolites. U.S. Pat. Nos. 4,061,724, 4,073,865 and 4,104,294 describe crystalline silicas of varying aluminum and metal content.

Zeolitic catalysts comprise a zeolite usually bound to a matrix, which usually contains alumina. When such catalysts are utilized in organic conversion processes, their catalytic activity is often diminished when they are subjected to deactivating conditions, such as steaming or oxygen regeneration, which are believed to result in displacement of aluminum from the zeolite framework. Although it is not presently known what happens to the displaced aluminum, it is apparent that as a result of deactivating conditions, the "effective" silica-to-alumina molar ratio can be raised. The effective silica-to-alumina ratio, which refers to the relative amount of silica and alumina ir the zeolite framework, can be determined by temperature programmed ammonia desorption (Kerr, et al., Thermochem. Act, 3, 113 (1971). The effective ratio can be differentiated from the bulk ratio of the zeolite, which is determined by elemental analysis. When the catalyst is deactivated, the effective silica to alumina molar ratio may be 50, 70, 100, or even higher. In fact, the effective silica to alumina molar ratio may be as high as, or higher than, 1500.

Highly siliceous aluminosilicate zeolites are particularly susceptible to such deactivation because they initially contain only relatively small amounts of aluminum in the framework. Accordingly, the present invention while suitable for aluminosilicates in general, is particularly useful in the activation of highly siliceous zeolites, i.e., zeolites having a silica to alumina molar ratio cf at least about 24, say, at least about 100, e.g., at least about 500 or even at least about 800.

Large pore size zeolites having a constraint index (C.I.) of less than 1, e.g., zeolites X, Y, mordenite, Ultrastable Zeolite Y (USY) and ZSM-20, can be activated by the method of the present invention. Intermediate pore size zeolites having a constraint index of about 1 to 12, e.g., ZSM-5, ZSM-5/ZSM-11 intermediate, ZSM-12, ZSM-23, ZSM-35, ZSM-38 and ZSM-48, are also suitable for treatment by the method of the present invention. An important characteristic of the crystal structure of these intermediate pore size crystalline aluminosilicates is that they provide constrained access to and egress from, the intracrystalline free space by virtue of having a pore dimension greater than about 5 Angstroms and pore windows of about a size such as would be provided by 10 membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred zeolites useful in this invention possess, in combination, a silica to alumina mole ratio of at least about 24; and a structure providing constrained access to the crystalline free space.

The members of this class of intermediate pore size zeolites have an effective pore size of generally from about 5 to about 8 angstroms, such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering of the rings or pore blockage may render these zeolites ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefulness of the particular porous crystalline silicate solely from theoretical structural considerations.

A convenient measure of the extent to which a zeolite provides control to molecules of varying sizes to its internal structure is the Constraint Index of the porous crystalline silicate. Porous crystalline aluminosilicates which provide a highly restricted access to and egress from its internal structure have a high value for the Constraint Index, and zeolites of this kind have pores of small size, e.g., less than 5 angstroms. On the other hand, porous crystalline aluminosilicates which provide relatively free access to the internal porous crystalline silicate structure have a low value for the Constraint Index, and usually pores of large size, e.g., greater than 8 angstroms. This method by which Constraint Index is determined is described fully in U.S. Pat. No. 4,016,218, incorporated herein by reference for details of the method. Constraint Index (CI) values for some typical materials are:

| | CI | (at test temperature) |
|---|---|---|
| ZSM-4 | 0.5 | (316° C.) |
| ZSM-5 | 6–8.3 | (371° C.–316° C.) |
| ZSM-11 | 5–8.7 | (371° C.–316° C.) |
| ZSM-12 | 2.3 | (316° C.) |
| ZSM-20 | 0.5 | (371° C.) |
| ZSM-22 | 7.3 | (427° C.) |
| ZSM-23 | 9.1 | (427° C.) |
| ZSM-34 | 50 | (371° C.) |
| ZSM-35 | 4.5 | (454° C.) |
| ZSM-38 | 2 | (510° C.) |
| ZSM-48 | 3.5 | (538° C.) |
| ZSM-50 | 2.1 | (427° C.) |
| TMA Offretite | 3.7 | (316° C.) |
| TMA Mordenite | 0.4 | (316° C.) |
| Clinoptilolite | 3.4 | (510° C.) |
| Mordenite | 0.5 | (316° C.) |
| REY | 0.4 | (316° C.) |
| Amorphous Silica-alumina | 0.6 | (538° C.) |
| Dealuminized Y | 0.5 | (510° C.) |
| Erionite | 38 | (316° C.) |
| Zeolite Beta | 0.6–2.0 | (316° C.–399° C.) |

It should be noted that Constraint Index seems to vary somewhat with severity of operations (conversion) and the presence or absence of binders. Likewise, other variables, such as crystal size of the zeolite, the presence of occluded contaminants, etc., may affect the Constraint Index. Therefore, it will be appreciated that it may be possible to so select test conditions, e.g., temperature, as to establish more than one value for the constraint index of a particular porous crystalline aluminosilicate. This explains the range of Constraint Indexes for some zeolites, such as ZSM-5, ZSM-11 and Beta.

It is to be realized that the above CI values typically characterize the specified porous crystalline aluminosilicates, but that such are the cumulative result of several variables useful in the determination and calculation thereof. Thus, for a given zeolite exhibiting a CI value within the range of 1 to 12, depending on the temperature employed during the test method within the range of 290° C. to about 538° C., with accompanying conversion between 10% and 60%, the CI may very within the indicated range of 1 to 12. Likewise, other variables such as the crystal size of the porous crystalline aluminosilicate, the presence of possibly occluded contaminants and binders intimately combined with the zeolite may affect the CI. It will accordingly be understood to those skilled in the art that the CI, as utilized herein, while affording a highly useful means for characterizing certain porous crystalline aluminosilicates of interest is approximate, taking into consideration the manner of its determination, with the possibility, in some instances, of compounding variable extremes.

The zeolitic catalyst composition of the invention comprises an aluminum-containing matrix material normally resistant to the temperature and other conditions employed in a chemical conversion process. Such matrix material is useful as a binder and imparts greater resistance to the catalyst for the severe temperature, pressure and reactant feed stream velocity conditions encountered in many processes, such as, for example, cracking. Useful matrix materials include both synthetic and naturally occurring substances, as well as aluminum-containing inorganic materials such as clay and/or metal oxides, e.g., alumina. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as silica-alumina, ternary compositions, such as silica-alumina-thoria, silica-alumina-zirconia, and silca-aluminamagnesia. The matrix may be in the form of a cogel. The relative proportions of zeolite component and inorganic matrix, on an anhydrous basis, may very widely with the zeolite content ranging from about 1 to about 99 percent by weight and more usually in the range of from about 5 to about 80 percent by weight of the dry composite.

In general, organic compounds such as, for example, those selected from the group consisting of hydrocarbons, alcohols and ethers, are converted to conversion products such as, for example, aromatics and lower molecular weight hydrocarbons, over the catalyst composition activated as described above by contact under organic compound conversion conditions. Such conditions may include a temperature of from about 100° C. to about 800° C., a pressure of from about 0.1 atmosphere (bar) to about 200 atmospheres, a weight hourly space velocity of from about 0.08 hr$^{-1}$ to about 2000 hr$^{-1}$ and a hydrogen/feedstock organic, e.g., hydrocarbon, compound mole ratio of from 0 (no added hydrogen) to about 100.

Such conversion processes include, as non-limiting examples, cracking hydrocarbons with reaction conditions including a temperature of from about 300° C., to about 700° C., a pressure of from about 0.1 atmosphere (bar) to about 30 atmospheres and a weight hourly space velocity of from about 0.1 to about 20; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from 0 to about 20; converting olefins to aromatics, e.g., benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g., methanol, or ethers, e.g., dimethylether, or mixtures thereof to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components with reaction conditions including a temperature of from about 230° C. to about: 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g., benzene and alkylbenzenes, in the presence of an alkylating agent, e.g., olefins, formaldehyde, alkylhalides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; transalkylating aromatic hydrocarbons in the presence of polyalkylaromatic hydrocarbons with reaction conditions including a temperature of from about 290° C. to about 500° C., a pressure of from about atmospheric to about 200 atmospheres, a weight hourly space velocity of from about 10 to about 10000 an aromatic hydrocarbon polyalkylaromatic/hydrocarbon mole ratio of from about 1/1 to about 16/1; and dewaxing gas oils with reaction conditions including a temperature of from about 250° C. to about 500° C., a pressure of from about 10 to 50 atmospheres, at a liquid hourly space velocity of from about 0.1 to about 10.

In order to more fully illustrate the nature of the invention and the manner of practicing same, the following examples are presented. In the examples, whenever Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec $^{-1}$). The Alpha Test is described in U.S. Pat. No. 3,354,078 and in *The Journal of Catalysis*, Vol. IV, pp. 527–529 (August 1965), each incorporated herein by reference as to that description. Alpha Tests are also described in *J. Catalysis*, 6, 278 (1966) and *J. Catalysis*, 61, 395 (1980), which are also incorporated herein by reference.

EXAMPLE 1

An extrudate consisting of 65 weight percent H-ZSM-5 having an effective $SiO_2/Al_2O_3$ ratio of about 1385, and 35 weight per cent $Al_2O_3$, and having an alpha value of 4 was treated with various $NH_4+$ solutions in an autoclave with 80 psig $NH_3$. The results are summarized in Table 1. With a 0.5N $(NH_4)_2CO_3$ solution at 50° C. for 3 days, no significant change in cracking activity was observed. When the temperature was increased to 100° C., the alpha value increased to 15. With a higher concentration solution of 1N, 20 hours treatment increased the alpha to 84. With 1N $NH_4OH$ solution at 100° C. for 20 hours, the alpha increased to 95. With 1N $(NH_4)_2HPO_4$ solution at 100° C. for 20 hours, alpha increased to 39.

EXAMPLE 2

In order to study the effects of increasing the concentration of $NH_3$ in solution, higher ammonia pressure was applied. Table 2 sets out the results of $NH_3$ treatment at 80 and 1000 psig of the extrudate of Example 1 as well as an extrudate having an effective $SiO_2/Al_2O_3$ ratio of 660. The results show the high pressure process gives lower activation as measured by the alpha test. The crystallinity calculated by n-$C_6$ sorption agrees with the crystallinity obtained by X-ray diffraction (XRD).

EXAMPLE 3

Table 3 sets out the results of an unbound high $SiO_2/Al_2O_3$ ZSM-5 zeolite having an effective silica to alumina mole ratio of 660 treated with $NH_3$ for 20 and 72 hours. The alpha of the zeolite remained unchanged indicating that no activation occurred in the absence of alumina binder.

TABLE 1

Treatment of ZSM-5 Extrudate ($SiO_2/Al_2O_3$ = 880)
100° C. for 20 hours
$NH_3$ Pressure = 80 psig

| Treatment | Conc. | Time (hr) | Alpha |
|---|---|---|---|
| — | — | — | 4 |
| $(NH_4)_2CO_3$ | 0.5N | 3 days* | 6 |
| $(NH_4)_2CO_3$ | 0.5N | 20 | 15 |
| $(NH_4)_2CO_3$ | 1N | 20 | 84 |
| $(NH_4)_2HPO_4$ | 1N | 20 | 39 |
| $NH_4OH$ | 1N | 20 | 95 |

*at 50° C.

TABLE 2

Activation of High $SiO_2/Al_2O_3$ ZSM-5 Extrudate
100° C.
$NH_3$ Pressure = 80 and 1000 psig

| | $SiO_2/Al_2O_3$ = 880 | | |
|---|---|---|---|
| Time (hr) | — | 20 | 20 |
| $NH_3$ P (psig) | — | 80 | 1000 |
| Alpha | 4 | 95 | 44 |
| n-$C_6$ sorp (%) relative | 7.90 | 5.43 | 5.26 |
| n-$C_6$ sorp (%) | 100 | 69 | 67 |
| XRD (%) | 100 | 69 | 69 |
| | $SiO_2/Al_2O_3$ = 520 | | |
| Time (hr) | — | 20 | 20 |
| $NH_3$ P (psig) | — | 80 | 1000 |
| Alpha | 16 | 193 | 109 |
| n-$C_6$ sorp (%) relative | 7.24 | 5.23 | 4.49 |

TABLE 2-continued

Activation of High SiO$_2$/Al$_2$O$_3$ ZSM-5 Extrudate
100° C.
NH$_3$ Pressure = 80 and 1000 psig

| n-C$_6$ sorp (%) | 100 | 72 | 62 |
|---|---|---|---|
| XRD (%) | 100 | 71 | 61 |

TABLE 3

Activation of High SiO$_2$/Al$_2$O$_3$ ZSM-5
100° C.

| | NH$_3$ Pressure = 80 psig | | |
|---|---|---|---|
| Form | extrudate | zeolite | zeolite |
| Time (hr) | 20 | 20 | 72 |
| Alpha (initial) | 16 | 16 | 16 |
| Alpha (final) | 193 | 15 | 16 |
| | NH$_3$ Pressure = 1000 psig | | |
| Form | extrudate | zeolite | zeolite |
| Time (hr) | 20 | 20 | 72 |
| Alpha (initial) | 16 | 16 | 16 |
| Alpha (final) | 109 | 18 | 14 |

EXAMPLE 4

A fresh catalyst containing 65 wt. % ZSM-5 and 35 wt. % alumina binder was deactivated while using the catalyst in a process for converting methanol to hydrocarbons, particularly gasoline boiling range hydrocarbons including aromatics. The silica to alumina molar ratio of the ZSM-5 in the fresh catalyst was 70:1. Coke was removed from the deactivated catalyst by calcining the catalyst in air for 12 hours at 538° C. This calcination removed 6 wt. % coke and gave a spent catalyst that had an effective silica to alumina ratio of about 400 to 1 and an alpha value of 8. This spent catalyst was reactivated by treatment in a sealed vessel for 20 hr. at 100° C. with 10 mol % aqueous ammonium hydroxide, washed with deionized water, dried at 110° C. and calcined at 538° C. The alpha value of the reactivated sample was 70.

EXAMPLE 5

The reactivated catalyst of Example 4 was used for methanol to gasoline conversion at 4 WHSV 83% methanol, 440° C. hot spot temperature, 300 psig, 9:1 molar He:methanol feed. Table 4 shows product distributions from methanol conversion over the first cycle, which lasted 4.5 days to methanol breakthrough. By way of comparison, the first cycle over the fresh catalyst lasted for 5.4 days to methanol breakthrough. The total first cycle C$_5$+ hydrocarbon yield for the reactivated catalyst was 75% of that for fresh catalyst. The calcined spent catalyst mentioned in Example 4, prior to reactivation lasted less than one hour until methanol breakthrough.

TABLE 4

Aging Test

| Time on Stream, hrs. | 5 | 52 | 76 | 108 |
|---|---|---|---|---|
| Selectivity to hydrocarbons, wt. % | 32.9 | 34.9 | 33.6 | 34.2 |
| Aromatics, wt. % | 13.0 | 10.1 | 10.7 | 10.2 |
| C$_5$ + hydrocarbons/ total hydrocarbons, wt. % | 71.6 | 67.0 | 73.0 | 71.7 |
| Methanol, wt. % | 0.0 | 0.0 | 0.0 | 0.1 |
| Water, wt. % | 67.1 | 65.1 | 66.4 | 65.7 |
| Dimethylether, wt. % | 0.0 | 0.0 | 0.0 | 0.0 |

EXAMPLE 6

A fresh catalyst containing 65 wt. % ZSM-5, silica to alumina ratio of about 70:1, and 35 wt. % alumina binder was deactivated while using the catalyst in a process for converting methanol to hydrocarbons, particularly gasoline boiling range hydrocarbons including aromatics. Coke was removed from the deactivated catalyst by calcining the catalyst in air at about 538° C.; the alpha value after calcination was 3, and the effective silica to alumina molar ratio was about 460 to 1. This spent catalyst was reactivated by treatment in a sealed vessel under autogenous pressure for 48 hours at 90° C. with 20 mol % (10.5M) aqueous ammonium hydroxide, washed with deionized water, dried at 110° C., and calcined at 538° C. The alpha value of the reactivated sample was 225. The reactivated catalyst was then treated for 4 hrs. at 500° C. with 0.6 atm water at 1.0 atmosphere overall pressure.

EXAMPLE 7

The catalyst of Example 6 was used for catalytic dewaxing of Nigerian Light Vacuum Gas Oil (pour point=70F) at 1.0 LHSV, 300 psig, 2000 SCF/B hydrogen. Table 5 compares the performance of catalyst from Example 6 with a fresh catalyst containing 65 wt. % ZSM-5, 70:1 silica to alumina ratio, and 35% alumina binder. In comparison, under the same process conditions, the spent catalyst of Example 6, before reactivation, was unable to convert Nigerian Light Vacuum Gas Oil to produce a 330F+ fraction with a pour point less than 70° F.

TABLE 5

Catalytic Dewaxing of Nigerian LVGO

| Catalyst | Fresh ZSM-5, 70:1 SiO$_2$/Al$_2$O$_3$ | Reactivated ZSM-5 (Example 6) |
|---|---|---|
| Days on stream | 16 | 29 |
| Temperature, °F. | 776 | 795 |
| Pressure, psig | 300 | 300 |
| LHSV | 1.0 | 1.0 |
| H$_2$ circulation, SCF/B | 2000 | 2000 |
| Product Distribution, wt. pct | | |
| C$_1$-C$_5$ gas | 15 | 16 |
| C$_6$-330° F. naphtha | 6 | 6 |
| 330° F. + gas oil | 79 | 78 |
| Pour point, 330° F. + fraction | −20 F | −27 F |

It is claimed:

1. A method for modifying a composition to increase its acid catalytic activity, said composition comprising a solid source of aluminum and a zeolite characterized by an effective silica to alumina mole ratio of at least about 50 and a constraint index of about 1 to 12, which method comprises contacting said composition at a temperature of about 60° to 200° C. for about 2 to 72 hours with an aqueous ammonium solution under ammonia gas pressure such that a pH of at least about 10 is maintained in said solution.

2. The method of claim 1 wherein the silica to alumina mole ratio is an effective mole ratio of at least about 100.

3. The method of claim 1 wherein said resulting composition is calcined.

4. The method of claim 1 wherein said ammonium is provided by an ammonium source selected from the group consisting of (NH$_4$)$_2$CO$_3$, NH$_4$OH and (NH$_4$)$_2$HPO$_4$.

5. The method of claim 4 wherein said silica to alumina mole ratio is at least about 660.

6. The method of claim 1 wherein said zeolite has a structure selected from the group consisting of ZSM-5, ZSM-5/ZSM-11, ZSM-11, ZSM-12, ZSM-23, ZSM-35, ZSM-38, ZSM-48 and zeolite beta.

7. The method of claim 6 wherein said aqueous ammonium solution has an ammonium concentration of about 1 to 15N.

8. The method of claim 6 wherein the ammonia gas pressure is applied autogenously, and the ammonium concentration is about 5 to 12N.

9. The method of claim 7 wherein said ammonia gas pressure ranges from 5 to 1000 psig.

10. The method of claim 9 wherein said zeolite is combined with an inorganic oxide matrix.

11. The method of claim 10 wherein said contacting occurs at a temperature ranging from about 90° to 150° C.

12. The method of claim 11 wherein said contacting occurs in the presence of a weak acid having a pKa of at least about 2 at 25° C.

13. The method of claim 11 wherein said contacting occurs in the presence of an alkylammonium hydroxide.

14. The method of claim 11 wherein said ammonium source is $NH_4OH$.

15. The method of claim 11 wherein said silica to alumina mole ratio is at least about 660.

16. The method of claim 11 wherein said zeolite has the structure of ZSM-5.

17. The method of claim 16 wherein said aqueous ammonium ion solution has an ammonium concentration of about 1N to 15N.

18. The method of claim 17 wherein said ammonia gas pressure ranges from about 5 to 1000 psig.

19. The method of claim 18 wherein said inorganic matrix is alumina.

20. The method of claim 19 wherein said contacting occurs at a temperature ranging from about 90° to 150° C.

21. The method of claim 12 wherein said contacting occurs in the presence of a weak acid selected from the group consisting of $H_2CO_3$, $H_3BO_3$ and citric acid.

22. The method of claim 13 wherein said alkylammonium hydroxide is tetrapropylammonium hydroxide.

23. The method of claim 1 wherein said zeolite is calcined after said contacting.

24. The method of claim 1 further comprising contacting the modified composition with steam.

* * * * *